(12) United States Patent
Balamane et al.

(10) Patent No.: US 8,335,056 B2
(45) Date of Patent: Dec. 18, 2012

(54) CPP SENSORS WITH HARD BIAS STRUCTURES THAT SHUNT SENSE CURRENT TOWARDS A SHIELD

(75) Inventors: Hamid Balamane, Portola Valley, CA (US); Jeffrey R. Childress, San Jose, CA (US); Robert E. Fontana, Jr., San Jose, CA (US); Jordan A. Katine, Mountain View, CA (US); Neil Smith, San Jose, CA (US)

(73) Assignee: HGST Netherlands, B.V., Amsterdam (NL)

( * ) Notice: Subject to any disclaimer, the term of this patent is extended or adjusted under 35 U.S.C. 154(b) by 1103 days.

(21) Appl. No.: 11/957,466

(22) Filed: Dec. 16, 2007

(65) Prior Publication Data

US 2009/0154027 A1     Jun. 18, 2009

(51) Int. Cl.
*G11B 5/39* (2006.01)
(52) U.S. Cl. .................... 360/319; 360/320; 360/324.12
(58) Field of Classification Search .................. 360/320, 360/319, 324.12
See application file for complete search history.

(56) References Cited

U.S. PATENT DOCUMENTS

| | | | |
|---|---|---|---|
| 6,327,107 B1 | 12/2001 | Komuro et al. | |
| 6,333,842 B1 | 12/2001 | Nobuyuki et al. | |
| 6,353,318 B1 | 3/2002 | Sin et al. | |
| 6,724,582 B2 | 4/2004 | Funayama et al. | |
| 6,754,055 B2 | 6/2004 | Ono et al. | |
| 6,757,143 B2 | 6/2004 | Tunayama et al. | |
| 6,801,413 B2 | 10/2004 | Seyama et al. | |
| 6,862,159 B2 * | 3/2005 | Hasegawa | 360/324.11 |
| 6,927,952 B2 | 8/2005 | Shimizu et al. | |
| 6,929,959 B2 | 8/2005 | Nishiyama et al. | |
| 7,093,347 B2 | 8/2006 | Nowak et al. | |
| 7,134,184 B2 * | 11/2006 | Chang et al. | 29/603.12 |
| 7,237,322 B2 * | 7/2007 | Gill | 29/603.13 |
| 7,280,324 B2 * | 10/2007 | Gill | 360/324.12 |
| 7,506,430 B2 * | 3/2009 | Chang et al. | 29/603.16 |
| 7,532,442 B2 * | 5/2009 | Gill | 360/324.11 |

(Continued)

FOREIGN PATENT DOCUMENTS

JP     2001084526 A     3/2001

(Continued)

OTHER PUBLICATIONS

Kamo et al. "A new biasing method for shielded MR head". J. Appl. Phys. 57, 3979 (1985).*

(Continued)

*Primary Examiner* — Julie Anne Watko
(74) *Attorney, Agent, or Firm* — Duft Bornsen & Fishman, LLP (57) ABSTRACT

Read sensors and associated methods of fabrication are disclosed. A read sensor as disclosed herein includes a first shield, a sensor stack including an antiparallel (AP) free layer, and insulating material disposed on the sensor stack. A aperture is formed through the insulating material above the sensor stack so that a subsequently deposited second shield is electrically coupled to the sensor stack through the aperture. The width of the aperture controls the current density that is injected into the top of the sensor stack. Also, hard bias structures may be formed to be electrically coupled to the sensor stack. The electrical coupling of the sensor stack and the hard bias structures allows current to laterally spread out as it passes through the sensor stack, and hence, provides a non-uniform current density.

8 Claims, 13 Drawing Sheets

U.S. PATENT DOCUMENTS

| | | | |
|---|---|---|---|
| 2003/0053269 A1 | 3/2003 | Nishiyama | |
| 2006/0209472 A1* | 9/2006 | Koui et al. | 360/324.1 |
| 2007/0019338 A1* | 1/2007 | Childress et al. | 360/324.1 |
| 2007/0041124 A1 | 2/2007 | Chang et al. | |
| 2007/0064352 A1* | 3/2007 | Gill | 360/324.11 |
| 2007/0146939 A1* | 6/2007 | Pinarbasi | 360/324.11 |

FOREIGN PATENT DOCUMENTS

| | | |
|---|---|---|
| JP | 2002359414 A | 12/2002 |
| JP | 2003298141 A | 10/2003 |
| JP | 2004165254 A | 6/2004 |

OTHER PUBLICATIONS

Katada et al., Spin-Torque Noise in CPP-GMR Heads With Current Screen Layer, IEEE Transactions on Magnetics, Oct. 2006, 2450-2452, vol. 42, No. 10, IEEE.

Jiang et al., Influence of Synthetic Antiferromagnet Free layer on Current-Perpendicular-to-Plane Spin Valves, IEEE Transactions on Magnetics, Jul. 2004, 2245-2247, vol. 40, No. 4, IEEE.

* cited by examiner

CPP SENSORS WITH HARD BIAS STRUCTURES THAT SHUNT SENSE CURRENT TOWARDS A SHIELD

BACKGROUND OF THE INVENTION

1. Field of the Invention

The invention is related to the field of magnetic recording disk drive systems and, in particular, to a current perpendicular to the plane (CPP) giant magnetoresistance (GMR) read sensor and associated methods of fabrication.

2. Statement of the Problem

Magnetic hard disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

In a disk drive utilizing perpendicular recording, data is recorded on a magnetic recording disk by magnetizing the recording medium in a direction perpendicular to the surface of the disk. CPP sensors typically include a sensor stack comprising an antiferromagnetic (AFM) layer, a reference layer, a spacer layer, a free layer, and a cap layer. The sensor stack is electrically coupled between two shield layers. A hard bias layer is electrically coupled to an upper shield layer, and insulating material (such as alumina) electrically separates the hard bias material and the sensor stack. Current flows from the upper shield through the sensor stack into the lower shield at a uniform current density.

In metallic CPP read sensors, one problem is that spin torque excitations limit the amount of current in the free layer and the reference layer. The spin torque excitations therefore limit the signal that may be obtained from the read sensor. Spin torque excitations are essentially noise induced when a sensing current is above a critical magnitude. Thus, the sensing current passing through the read sensor is limited by the spin torque excitations of the free layer and the reference layer. Further, because the current density is uniform, any spin torque suppression techniques applied only to the free layer are inadequate, because the current density of the reference layer becomes the limiting factor of the read sensor.

SUMMARY OF THE SOLUTION

Embodiments of the invention solve the above and other related problems with improved read sensors and associated methods of fabrication which minimize spin torque excitations such that larger current density signals may pass through a free layer of the read sensor. A read sensor is provided that incorporates an (antiparallel) AP free layer into the sensor stack which suppresses spin torque effects in the free layer. This AP free layer structure allows for an increase in the maximum operable current density for the read sensor over the maximum operable current density utilized with a simple free layer structure.

In one embodiment, hard bias structures are electrically coupled to the sensor stack, and electrically isolated from the upper shield layer. The electrical coupling of the sensor stack and the hard bias structures allows current to laterally spread out as it passes through the sensor stack. Advantageously, a non-uniform current density is provided in the sensor stack, such that the current density that passes through the AP free layer is higher than the current density passing through the reference layer. This is because as current passes through the AP free layer, it spreads laterally through the hard bias structures directly contacting the sensor stack.

The average current density (and therefore signal) of the read sensor can be increased until either the current density in the reference layer reaches a critical current density for the reference layer, or the current density in the AP free layer reaches a critical current density for the AP free layer. Advantageously, the read sensor may operate with a larger sensing current than prior CPP GMR read sensors. Further, the improved read sensor structure minimizes the parasitic resistance of an AFM layer of the sensor stack, improving the sensing signal.

In another exemplary embodiment of the invention, a read sensor comprises a first shield and a sensor stack including an antiparallel (AP) free layer electrically coupled to a surface of the first shield. The read sensor further comprises hard bias structures electrically coupled to the sensor stack on opposing sides of the sensor stack and electrically coupled to the surface of the first shield. The resistance of the hard bias structures may be less than or equal to the resistance of an AFM layer of the sensor stack. The read sensor may further comprise insulating material disposed on the sensor stack and the hard bias structures. The read sensor further comprises a second shield disposed on the insulating material. The insulating material has an aperture providing electrical coupling of the sensor stack and the second shield. A width of the aperture may be substantially smaller than a width of the AP free layer to control the current density provided to the AP free layer. The improved structure of the read sensor allows for a non-uniform current density, and suppression of spin-torque excitations in the free layer and reference layer of the sensor stack.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-29 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
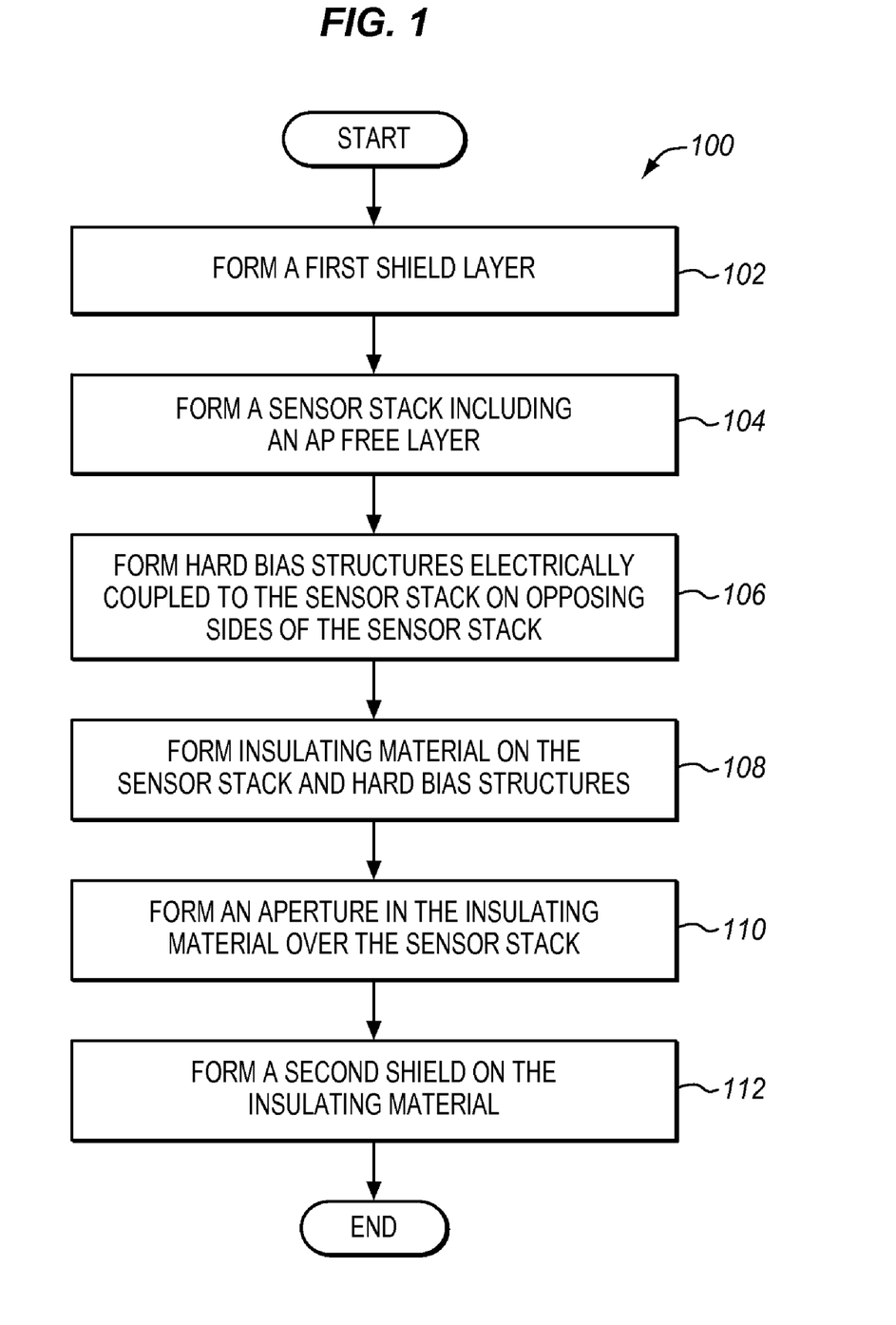
FIG. 1 is a flow chart illustrating a method for fabricating a read sensor in an exemplary embodiment of the invention.

FIG. 1 is a flow chart illustrating a method 100 for fabricating a read sensor in an exemplary embodiment of the invention. FIGS. 2-7 illustrate cross sectional views of a read sensor 200 during fabrication according to method 100 of FIG. 1 in exemplary embodiments of the invention, and the steps of method 100 are described in reference to read sensor 200 of FIGS. 2-7. The steps of method 100 may not be all-inclusive, and may include other steps not shown for the sake of brevity.

Figure 2:
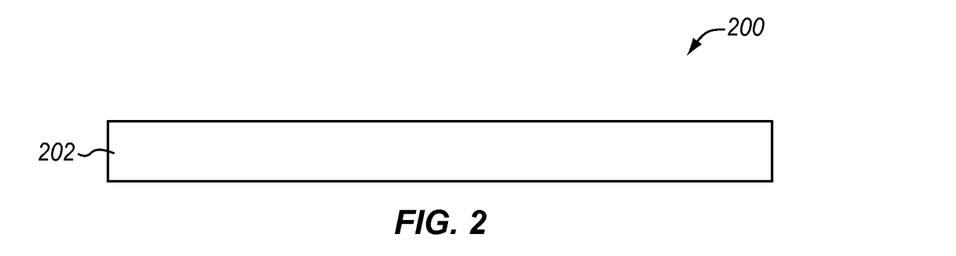
FIGS. 2-7 illustrate cross sectional views of a read sensor during fabrication according to the method of FIG. 1 in exemplary embodiments of the invention.
Figure 3:
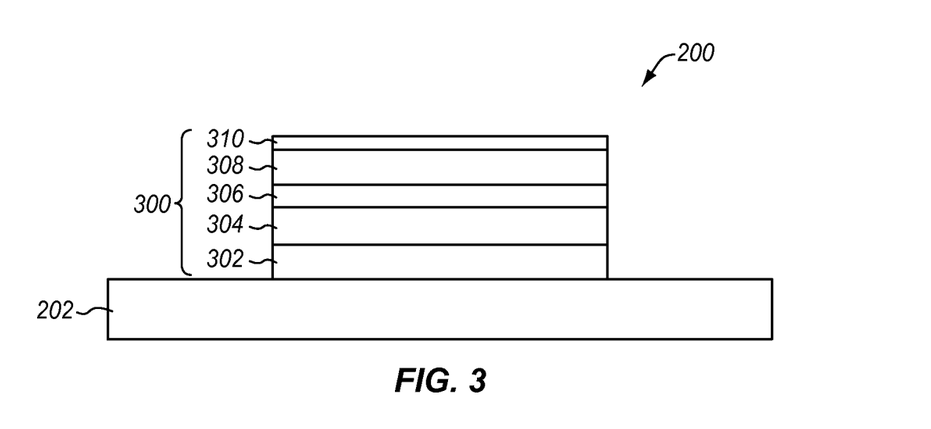

Step 102 comprises forming a first shield layer 202 (see FIG. 2). Step 104 comprises forming a sensor stack 300 (see FIG. 3) on a surface of shield layer 202 (which is the top surface of FIG. 3). Sensor stack 300 includes an AFM layer 302, a reference layer 304 or pinned layer (which may be an anti-parallel structure), a non-magnetic spacer layer 306, an AP free layer 308, and a cap layer 310. AP free layer 308 is disposed between non-magnetic spacer layer 306 and cap layer 310. Sensor stack 300 may include other layers in other embodiments. Sensor stack 300 may be formed by depositing a full film of each layer, and performing a lithographic and etching process to define a width of sensor stack 300. The lithographic process may form a straight sensor stack 300 as illustrated in FIG. 3. The resulting structure of read sensor 200 after completion of step 104 is illustrated in FIG. 3

Figure 4:
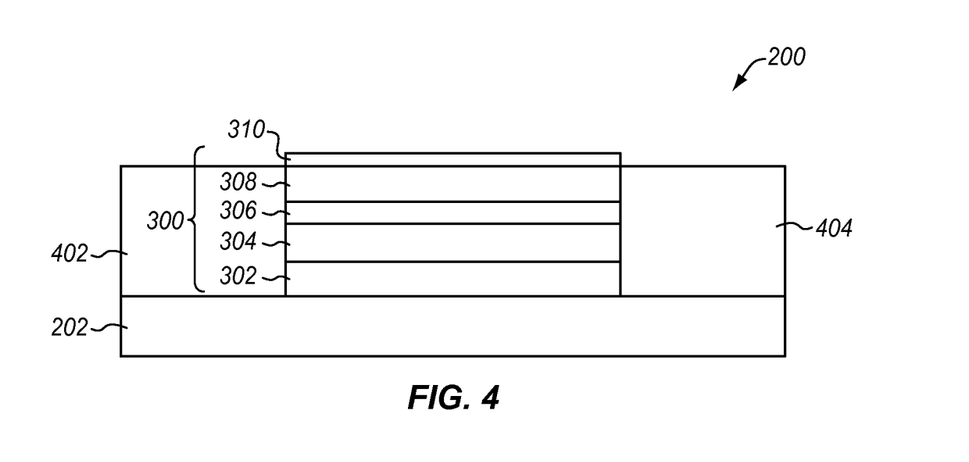

Step 106 (an optional step) comprises forming hard bias structures 402, 404 electrically coupled to sensor stack 300 on opposing sides of sensor stack 300. The electrical coupling of hard bias structures 402, 404 and sensor stack 300 allows current to pass from sensor stack 300 into hard bias structures 402, 404. As a sensing current passes through sensor stack 300 in a direction from cap layer 310 to AFM layer 302, the sensing current spreads laterally into hard bias structures 402, 404. Normally there is a significant amount of parasitic resistance caused by AFM layer 302. Because the sensing current may pass through hard bias structures 402, 404 in addition to the AFM layer 302, the parasitic resistance of AFM layer 302 may be minimized. The resistance of hard bias structures 402, 404 may be less than or equal to a resistance of AFM layer 302 such that a current path through hard bias structures 402, 404 provides less resistance to the sensing current than a current path through AFM layer 302. Hard bias structures 402, 404 may include not only the hard magnetic material, but also seed layers and capping layers.

It is desirable to have a higher current density in AP free layer 308 than reference layer 304. To achieve this non-uniform current density in sensor stack 300, the heights of hard bias structures 402, 404 may be less than a height of sensor stack 300. More particularly, heights (i.e., the dimension in a direction perpendicular to an air bearing surface (ABS) of read sensor 200) of the hard bias structures 402, 404 may be substantially planar to a top surface of AP free layer 308. The top surface of AP free layer 308 is the surface coupled to a cap layer 310. This provides for a lateral spreading of current into hard bias structures 402, 404 as current passes through AP free layer 308. Thus, the current density in AP free layer 308 may be significantly higher than the current density in reference layer 304. The resulting structure of read sensor 200 after completion of step 106 is illustrated in FIG. 4.

Figure 5:
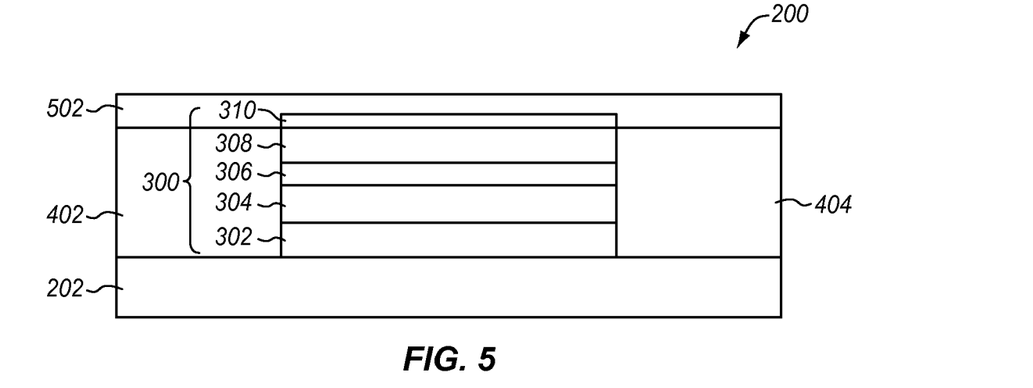
Figure 6:
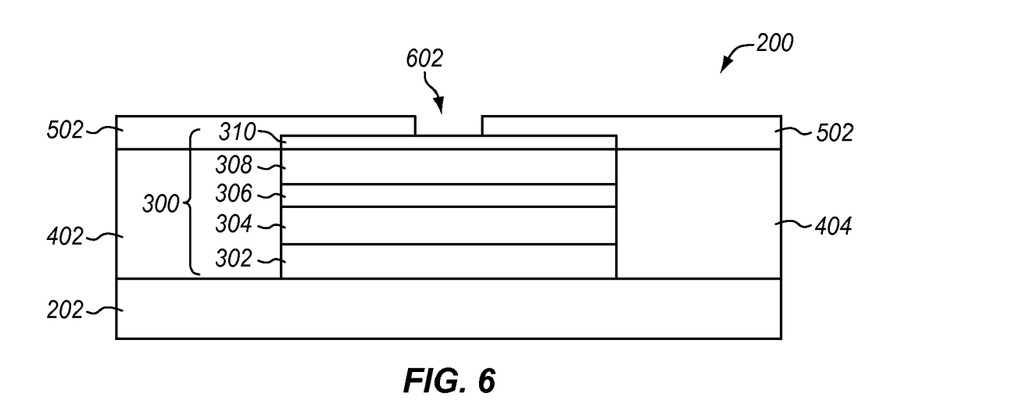

Step 108 comprises forming insulating material 502 (see FIG. 5), such as alumina, on sensor stack 300 and hard bias structures 402, 404. The resulting structure of read sensor 200 after completion of step 108 is illustrated in FIG. 5. Step 110 comprises forming an aperture 602 in insulating material 502 at a location above sensor stack 300. Aperture 602 may be formed by performing a lithographic and etching process to remove a portion of insulating material 502. A width of aperture 602 may be substantially smaller than a width of AP free layer 308. The ratio between the width of aperture 602 and the width of AP free layer 308 may range from 1:1 to 1:20. Aperture 602 provides electrical coupling of sensor stack 300 and a second shield (to be described below) of read sensor 200. The width of aperture 602 is selected to control the current density applied to sensor stack 300. A smaller area of contact between sensor stack 300 and the second shield provides for a higher current density in AP free layer 308. The resulting structure of read sensor 200 after completion of step 110 is illustrated in FIG. 6.

Figure 7:
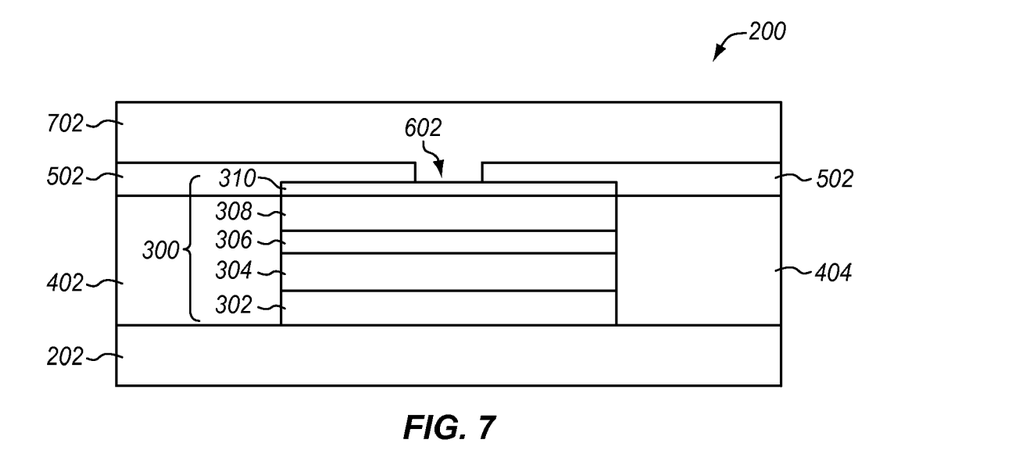

Step 112 comprises forming a second shield 702 on insulating material 502. A portion of second shield 702 is formed within aperture 602 such that cap layer 310 and second shield 702 are electrically coupled. The area of contact between second shield 702 and cap layer 310 (i.e., the area of aperture 602) provides a high current density flow between second shield 702 and sensor stack 300. Thus, adjusting the size of aperture 602 changes the current density provided to cap layer 310. The resulting structure of read sensor 200 after completion of step 112 is illustrated in FIG. 7.

The signal (i.e., the voltage) generated when a sensing current is passed through a read sensor is equal to the sum, over all interfaces and layers, of $j_n \Delta RA_n$, where $j_n$ is the current density in that layer or interface, and $\Delta RA_n$ is the magnetoresistance-area product of that layer or interface. In an AP free layer geometry (with the reference layer closest to the bottom shield and the free layer closest to the top shield), when current passes from the top shield to the bottom shield, spin torque excitations are strongly suppressed in the free layer, such that the critical current density of the free layer increases. Thus, AP free layer 308 suppresses spin torque effects and allows for an increase in the maximum operable current density for read sensor 200 over a simple free layer structure. However, spin torque excitations in the reference layer still limit the amount of current that can pass through reference layer 304, and thus, the overall current which may be utilized in read sensor 200.

If a non-uniform current density can be provided within sensor stack 300, such that the current density in AP free layer 308 is higher than the current density in reference layer 304, then spin torque excitation problems may be minimized. As long as the current density within reference layer 304 is less than a critical magnitude, then no spin-torque excitations will occur in the bottom portion of read sensor 200. A current density higher than the critical magnitude of reference layer 304 may be applied to sensor stack near AP free layer 308 (e.g., through cap layer 310). The anti-parallel structure of AP free layer 308 suppresses spin torque excitations in the upper portion of sensor stack 300 such that a relatively high current density may pass through AP free layer 308. The current then spreads laterally through a hard bias layer directly contacting sensor stack 300. Thus, the current density in reference layer 304 may be significantly less than the current density in AP free layer 308.

Read sensor 200 is different from prior art read sensors, because it includes an aperture 602 separating second shield 702 and cap layer 310, and hard bias structures 402, 404 of read sensor 200 are electrically coupled to sensor stack 300. In operation of read sensor 200, a sensing current passes from second shield 702 through sensor stack 300 (via aperture 602) into first shield 202. The sensing current is injected through aperture 602 into an area smaller than the lithographic area (e.g., the width) of sensor stack 300. As the current passes through sensor stack 300, it spreads laterally, especially when the current reaches non-magnetic spacer layer 306. The current density of AP free layer 308 is therefore significantly larger than the current density in reference layer 304. Further, the current density in reference layer 304 will be less than the critical current density such that spin torque excitations don't occur. The effective area of read sensor 200, and therefore the resistance-area (RA) product will depend on the details of aperture 602 and sensor geometries. The average current density (and therefore signal) of read sensor 200 may be increased until either the current density in the reference layer 304 reaches the critical current density for reference layer 304, or the current density in AP free layer 308 reaches the critical current density for AP free layer 308. Advantageously, read sensor 200 may operate with a larger sensing current than prior CPP GMR read sensors. Further, the improved structure of read sensor 200 minimizes the parasitic resistance of AFM layer 304, improving the generated signal.

With a straight sensor stack 300, the layers may be substantially the same width (see FIG. 3) to form straight sensor walls between sensor stack 300 and hard bias structures 402, 404. Alternatively, a width of cap layer 310 may be substantially smaller than a width of AP free layer 308, and widths of the other layers (e.g., AFM layer 302, reference layer 304, non-magnetic spacer layer 306, and AP free layer 308) may be substantially the same. The ratio between the width of cap layer 310 and the width of AP free layer 308 may be between 1:1 and 1:20. The width of cap layer 310 may be selected to control the current density applied to AP free layer 308. A straight sensor stack 300 provides for cancellation of demagnetizing fields if reference layer 304 is an antiparallel structure.

Alternatively, sensor stack 300 may have a trapezoidal shape, with AFM layer 302 having the largest width, and cap layer 310 having the smallest width. Normally, if the walls of a sensor stack are sloped, then the two edges will give unequal demagnetizing fields, which may degrade the free layer stability. However, sloped walls minimize the parasitic resistance contribution from bottom stack layers (especially AFM layers). Because hard bias structures 402, 404 of read sensor 200 are directly contacting sensor stack 300, the sensing current will spread out into hard bias structures 402, 404, and a minimization of the parasitic resistance from the sloped walls is unnecessary. Those of ordinary skill in the art will recognize other differences between using straight or sloped walls for sensor stack 300, and the shape of sensor stack 300 may be a matter of design criteria.

Figure 8:
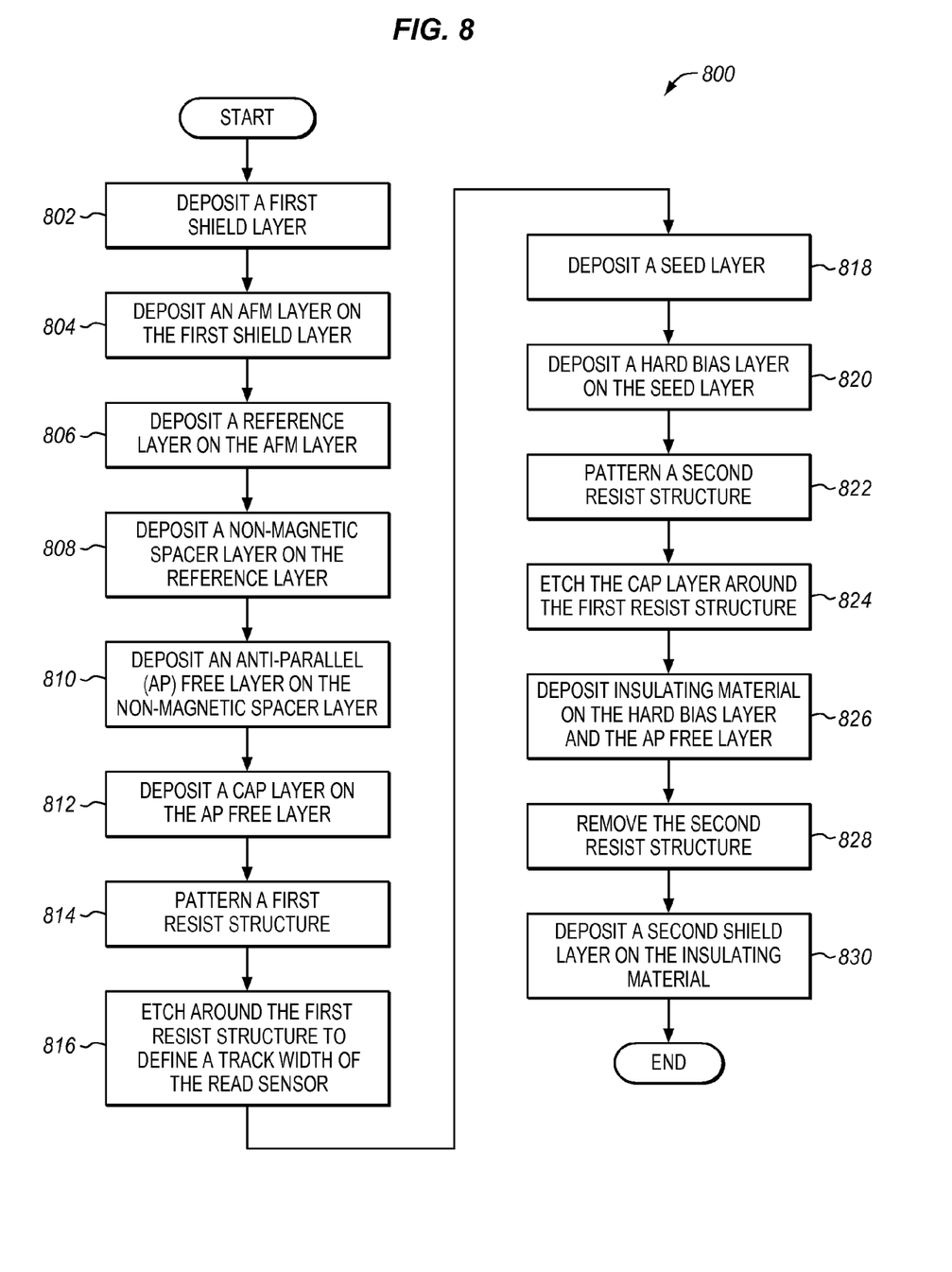
FIG. 8 is a flow chart illustrating another method for fabricating a read sensor in an exemplary embodiment of the invention.

FIG. 8 is a flow chart illustrating another method 800 for fabricating a read sensor in an exemplary embodiment of the invention. More particularly, method 800 utilizes multiple masking structures which allows for the formation of a cap layer which is narrower than other layers of a sensor stack. FIGS. 9-20 illustrate cross sectional views of a read sensor 900 during fabrication according to method 800 of FIG. 8 in exemplary embodiments of the invention, and the steps of method 800 are described in reference to read sensor 900 of FIGS. 9-21. The steps of method 800 may not be all-inclusive, and may include other steps not shown for the sake of brevity.

Figure 9:
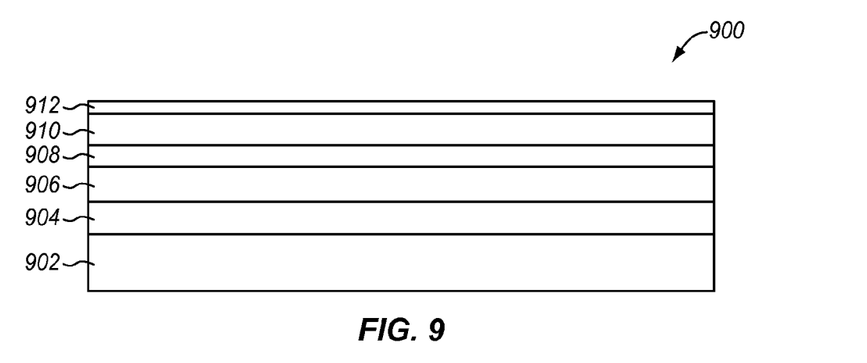
FIGS. 9-20 illustrate cross sectional views of a read sensor during fabrication according to the method of FIG. 8 in exemplary embodiments of the invention.

Step 802 comprises depositing a first shield layer 902 (see FIG. 9). Next, a sensor stack of read sensor 900 is deposited on first shield layer 902. Steps 804 to 812 comprise: depositing an AFM layer 904 on first shield layer 902 (step 804), depositing a reference layer 906 on AFM layer 904 (step 806), depositing a non-magnetic spacer layer 908 on reference layer 906 (step 808), depositing an AP free layer 910 on non-magnetic spacer layer 908 (step 810), and depositing a cap layer 912 on AP free layer 910 (step 812). The resulting structure of read sensor 900 after completion of step 812 is illustrated in FIG. 9.

Figure 10:
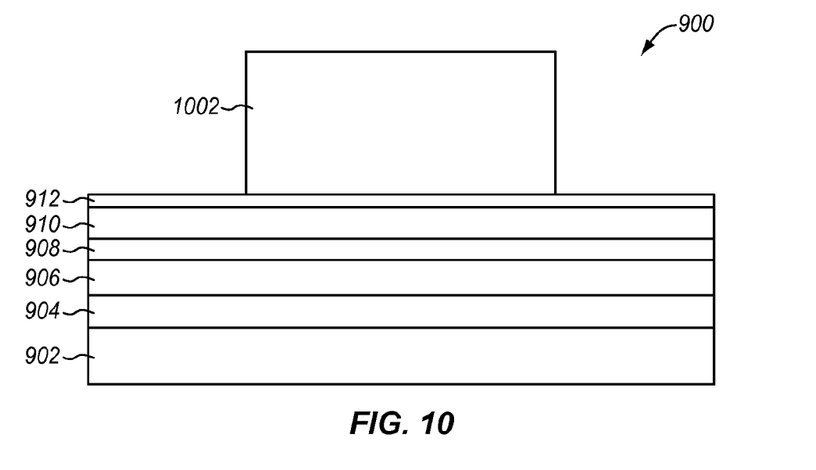

Step 814 comprises patterning a first resist structure 1002 (see FIG. 10) on top of the layers. A lithographic process may be performed to define first resist structure 1002. Resist structure 1002 defines a width of a sensor stack of read sensor 900, and hence, the track width of read sensor 900. The resulting structure of read sensor 900 after completion of step 814 is illustrated in FIG. 10.

Figure 11:
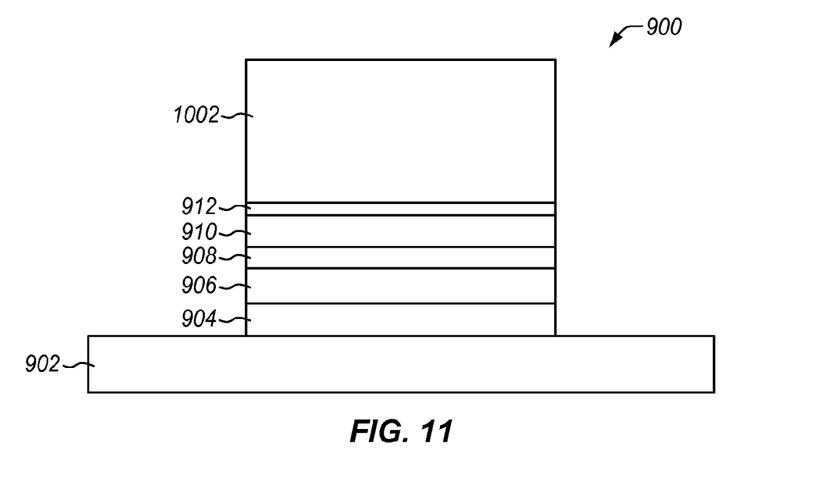

Step 816 comprises etching around resist structure 1002 to define a track width of read sensor 900. Ion milling may be performed to etch read sensor 900. The resulting structure of read sensor 900 after completion of step 816 is illustrated in FIG. 11.

Figure 12:
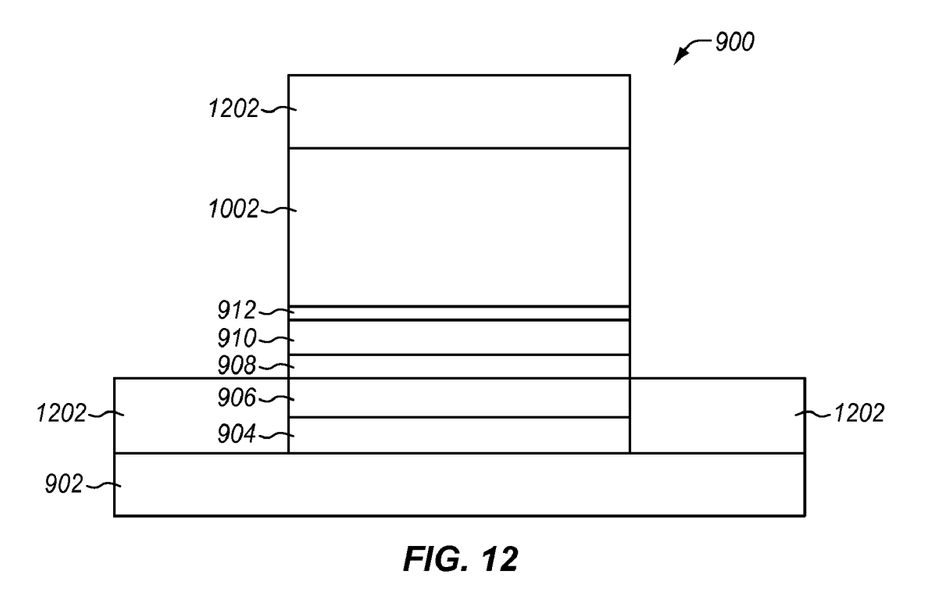

Step 818 comprises depositing a seed layer 1202 (see FIG. 12) orthogonal to resist structure 1002. Seed layer 1202 is used to subsequently form a hard bias layer, and more specifically, to facilitate a desired grain structure fabrication of the hard bias layer. The depth of seed layer 1202 may be selected based on desired design criteria. Because of the orthogonal deposition of seed layer 1202, there will be minimal seed layer material deposited along the side walls of resist structure 1002. The resulting structure of read sensor 900 after completion of step 818 is illustrated in FIG. 12.

Figure 13:
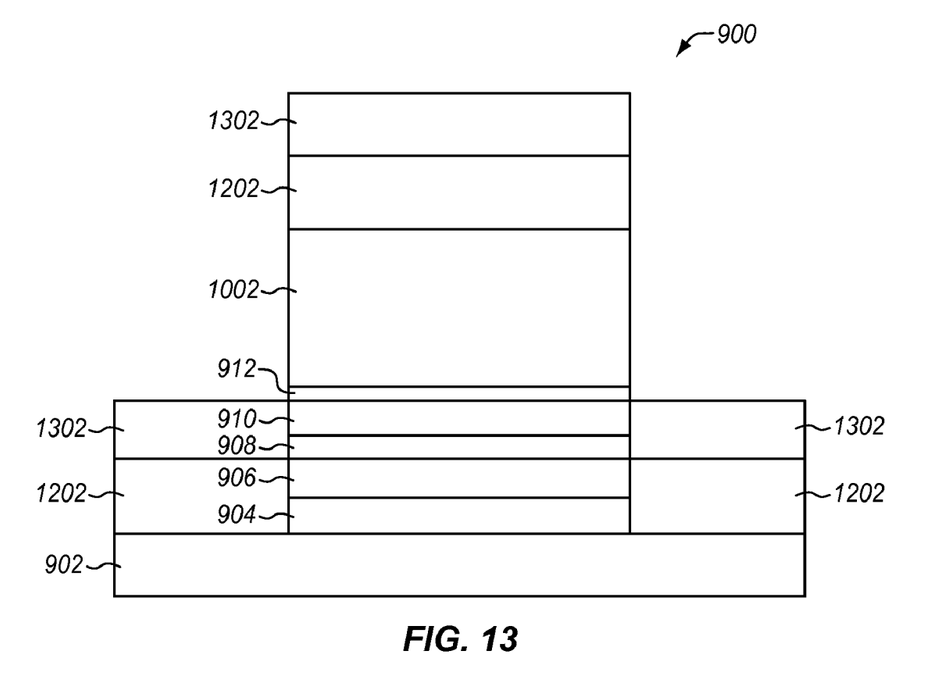

Step 820 comprises depositing a hard bias layer 1302 (see FIG. 13) on seed layer 1202 orthogonal to resist structure 1002. Hard bias layer 1302 (and, if necessary, a protective cap) is deposited to a height on side regions of AP free layer 910 that is substantially planar to a boundary between AP free layer 910 and cap layer 912 (e.g., a top surface of AP free layer 910). Hard bias layer 1302 is also formed on top of resist structure 1002 during the deposition. This upper portion of hard bias layer 1302 is subsequently removed during a removal of resist structure 1002. Because of the orthogonal deposition of hard bias layer 1302, there will be minimal hard bias layer material deposited along the side walls of resist structure 1002. The resulting structure of read sensor 900 after completion of step 820 is illustrated in FIG. 13.

Figure 14:
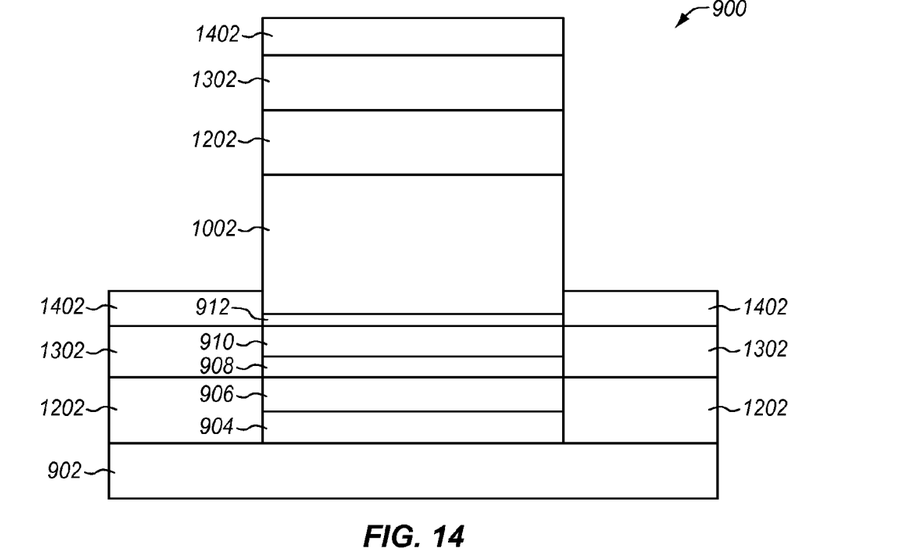
Figure 15:
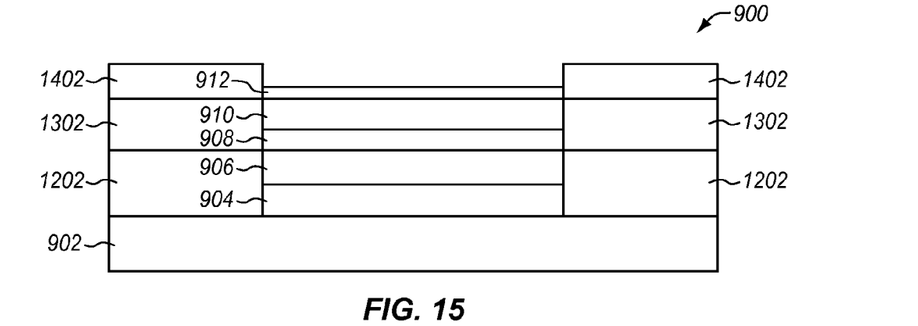

Step 822 comprises depositing insulating material 1402 (see FIG. 14) on hard bias layer 1302. Insulating material 1402 may be deposited orthogonally with respect to resist structure 1002. The resulting structure of read sensor 900 after completion of step 822 is illustrated in FIG. 14. Step 824 comprises removing resist structure 1002. Resist structure 1002 may be removed using a stripping process that also removes portions of seed layer 1202 and hard bias layer 1302 above resist structure 1002. The resulting structure of read sensor 900 after completion of step 824 is illustrated in FIG. 15.

Figure 16:
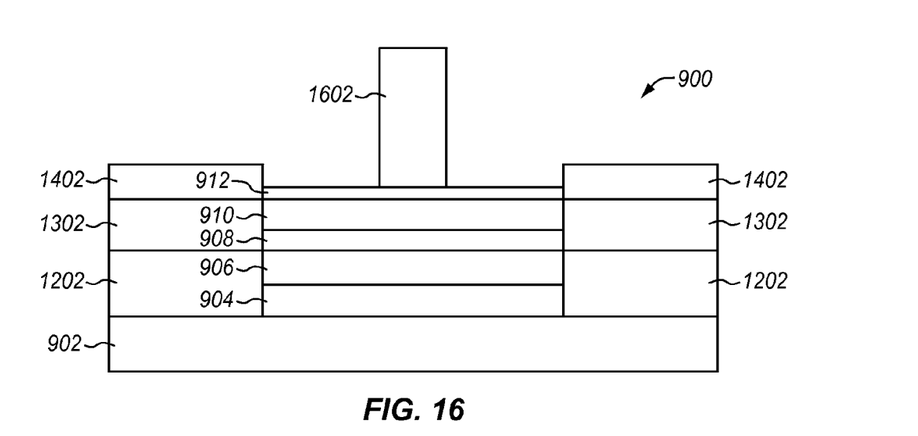

Step 826 comprises patterning a second resist structure 1602 (see FIG. 16) on cap layer 912. A lithographic process may be performed to define resist structure 1602. Resist structure 1602 defines a width of cap layer 912 and an area of electrical coupling between cap layer 912 and a subsequently formed shield layer. The resulting structure of read sensor 900 after completion of step 826 is illustrated in FIG. 16.

Figure 17:
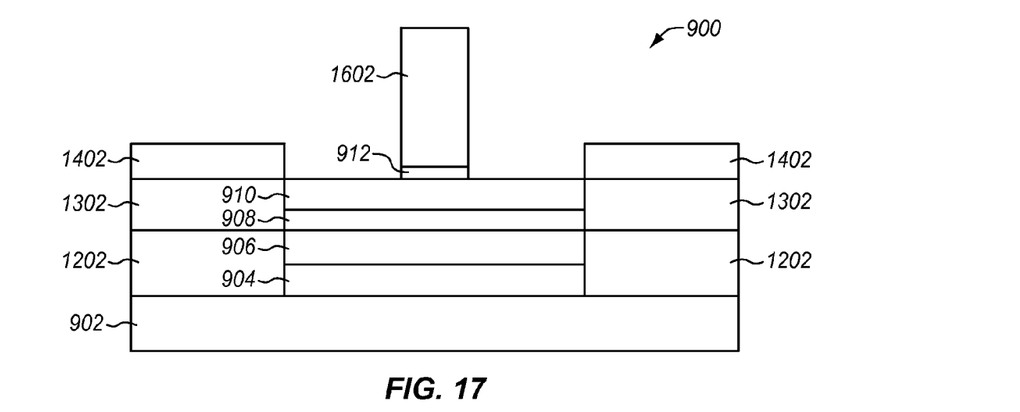

Step 828 comprises etching cap layer 912 around resist structure 1602 to define a width of cap layer 912 that is substantially smaller than a width of AP free layer 910 (see FIG. 17). The width of cap layer 912 may be selected to define the area of contact between the sensor stack and a subsequently formed shield layer. This area of contact controls the current density applied to AP free layer 910.

Figure 18:
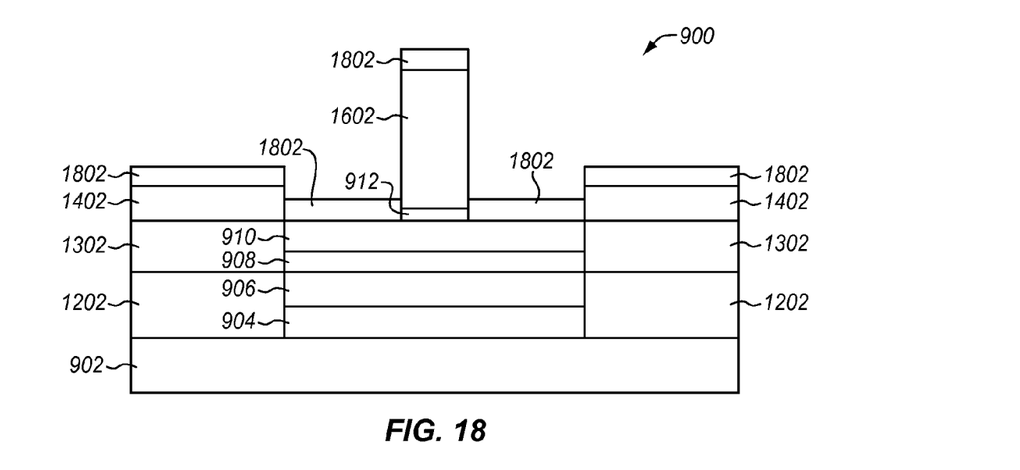

Step 830 comprises depositing insulating material 1802. Insulating material 1802 may be deposited orthogonally with respect to resist structure 1602, such that there will be minimal insulating material deposited along the side walls of resist structure 1602. The resulting structure of read sensor 900 after completion of step 830 is illustrated in FIG. 18.

Figure 19:
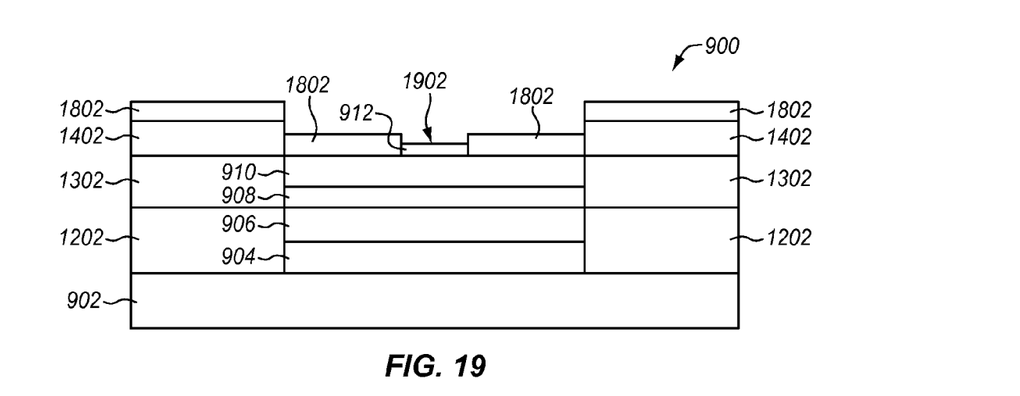

Step 832 comprises removing resist structure 1602, such as with a stripping process. The removal of resist structure 1602 leaves an aperture 1902 in insulating material 1802, which exposes cap layer 912. The resulting structure of read sensor 900 after completion of step 832 is illustrated in FIG. 19.

Figure 20:
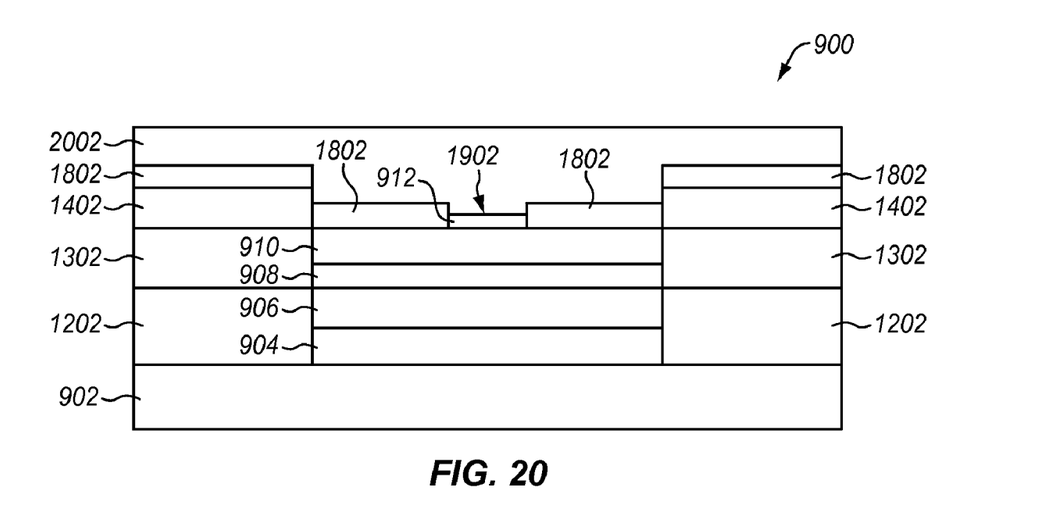

Step 834 comprises depositing a second shield layer 2002 on insulating material 1802. A portion of second shield 2002 is formed within aperture 1902 such that second shield 2002 and cap layer 912 are electrically coupled. The area of contact between second shield 2002 and cap layer 912 (i.e., the area of aperture 1902) provides a high current density flow between second shield 2002 and the sensor stack. Thus, adjusting the size of aperture 1902 changes the current density provided to cap layer 912. The resulting structure of read sensor 900 after completion of step 834 is illustrated in FIG. 20. Depending on the desired spacing between the shields, some of this cap layer may be etched, in situ, prior to depositing the second shield.

Figure 21:
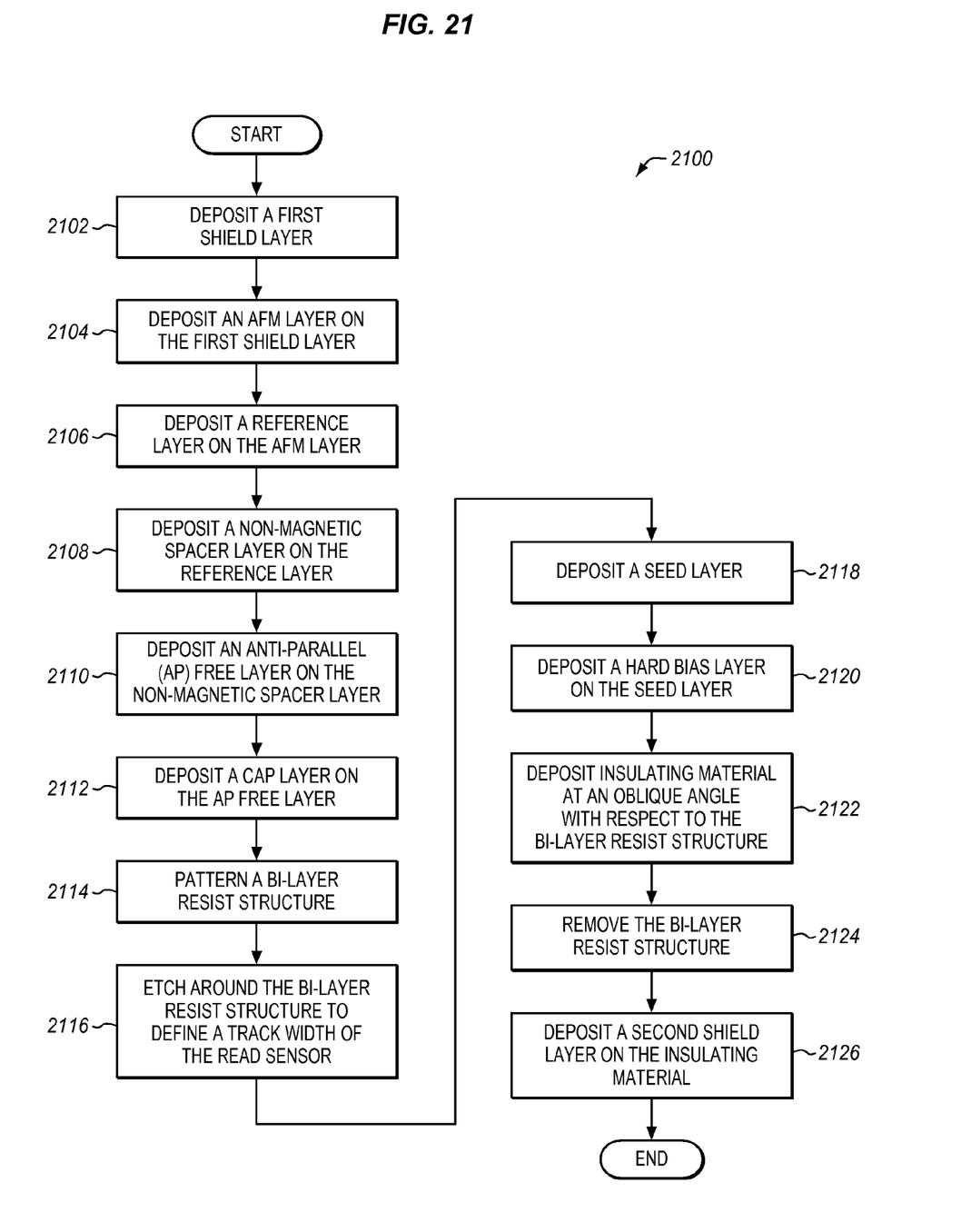
FIG. 21 is a flow chart illustrating another method for fabricating a read sensor in an exemplary embodiment of the invention.

FIG. 21 is a flow chart illustrating a method 2100 for fabricating a read sensor in an exemplary embodiment of the invention. More specifically, method 2100 utilizes a bi-layer masking structure to form an angled aperture in an upper shield of a read sensor. FIGS. 22-29 illustrate cross sectional views of a read sensor 2100 during fabrication according to method 2100 of FIG. 21 in exemplary embodiments of the invention, and the steps of method 2100 are described in reference to read sensor 2000 of FIGS. 22-29. The steps of method 2100 may not be all-inclusive, and may include other steps not shown for the sake of brevity.

Figure 22:
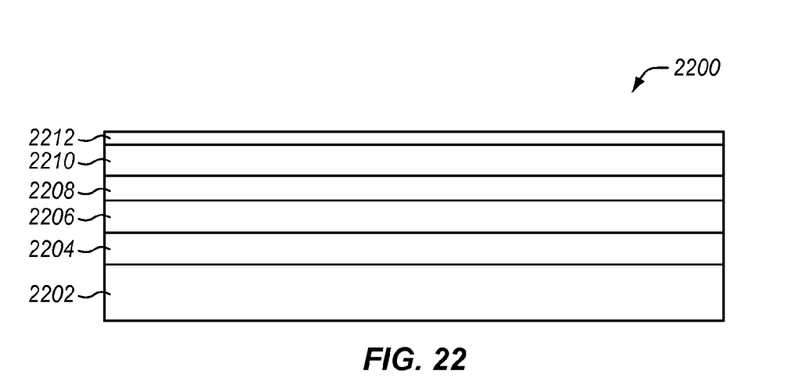
FIGS. 22-29 illustrate cross sectional views of a read sensor during fabrication according to the method of FIG. 21 in exemplary embodiments of the invention.

Step 2102 comprises depositing a first shield layer 2202 (see FIG. 22). Next, a sensor stack of read sensor 2200 is deposited on first shield layer 2202. Steps 2104 to 2112 comprise: depositing an AFM layer 2204 on first shield layer 2202 (step 2104), depositing a reference layer 2206 on AFM layer 2204 (step 2106), depositing a non-magnetic spacer layer 2208 on reference layer 2206 (step 2108), depositing an AP free layer 2210 on non-magnetic spacer layer 2208 (step 2110), and depositing a cap layer 2212 on AP free layer 2210 (step 2112). The resulting structure of read sensor 2200 after completion of step 2112 is illustrated in FIG. 22.

Figure 23:
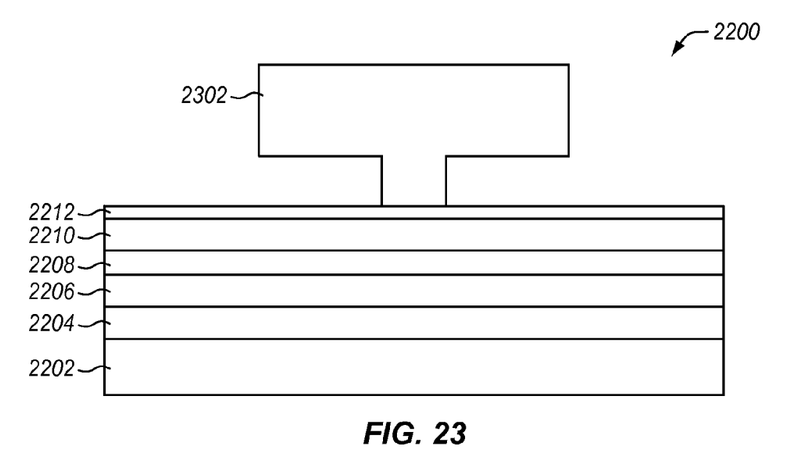

Step 2114 comprises patterning a bi-layer resist structure 2302 (see FIG. 23). A lithographic process may be performed to define bi-layer resist structure 2302. An upper portion of bi-layer resist structure 2302 defines a width of a sensor stack of read sensor 2200, and hence, the track width of read sensor 2200. A lower portion of bi-layer resist structure 2302 defines a width of an aperture in a subsequently formed shield layer. The resulting structure of read sensor 2200 after completion of step 2114 is illustrated in FIG. 23.

Figure 24:
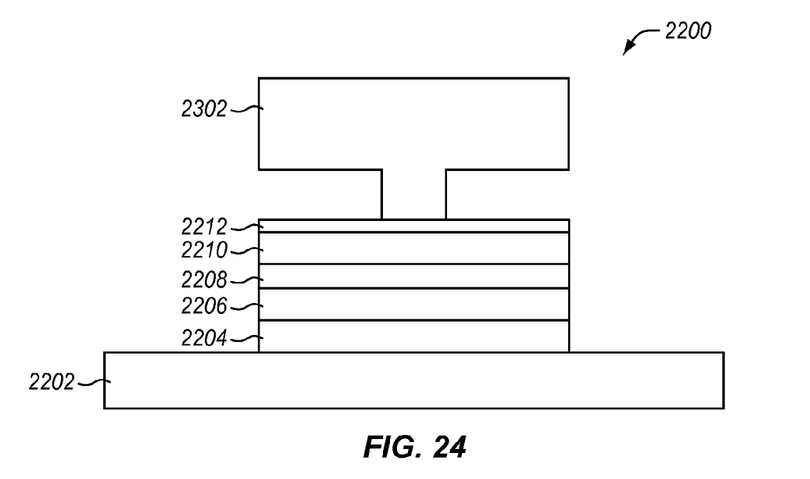
Figure 25:
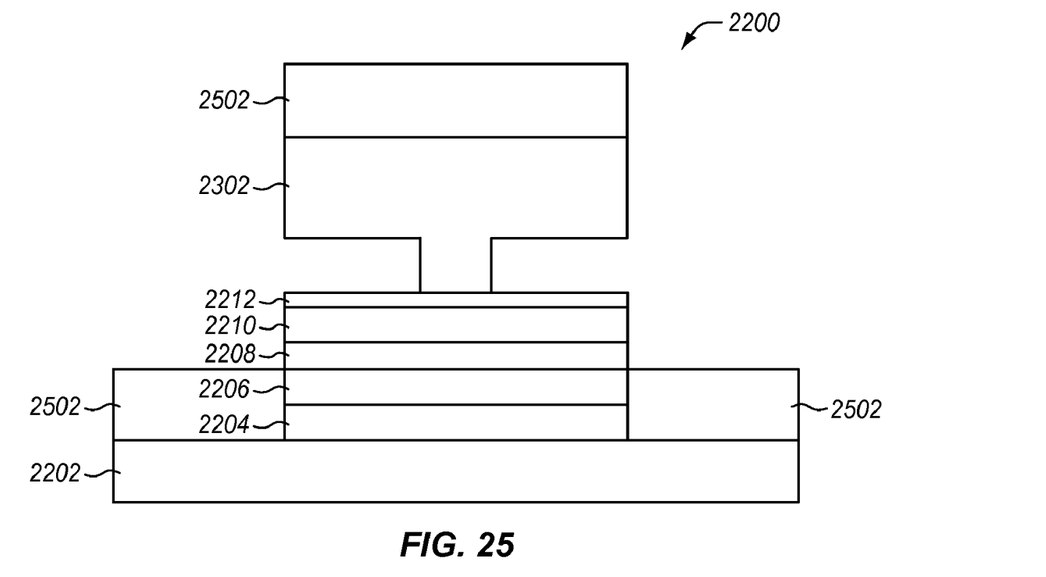

Step 2116 comprises etching around bi-layer resist structure 2302 to define a track width of read sensor 2200. The resulting structure of read sensor 2200 after completion of step 2116 is illustrated in FIG. 24. Step 2118 comprises depositing a seed layer 2502 (see FIG. 25) orthogonal to bi-layer resist structure 2302. The resulting structure of read sensor 2200 after completion of step 2118 is illustrated in FIG. 25.

Figure 26:
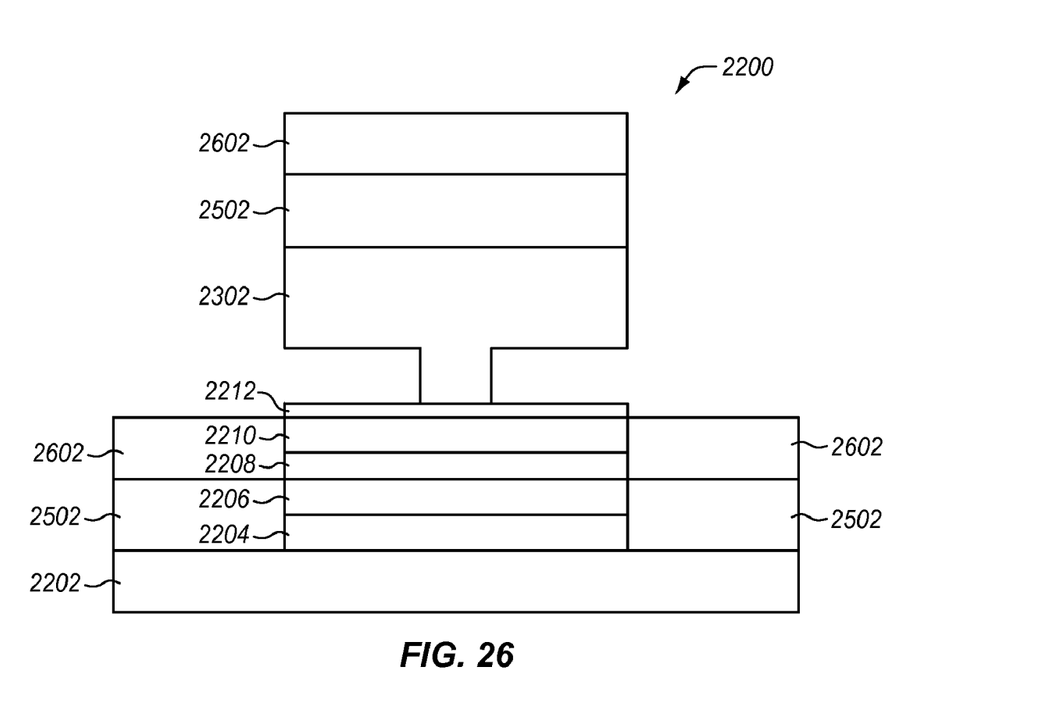

Step 2120 comprises depositing a hard bias layer 2602 (see FIG. 26) on seed layer 2502 orthogonal to bi-layer resist structure 2302. Hard bias layer 2602 is deposited to a height on side regions of AP free layer 2210 that is substantially equal to a boundary between AP free layer 2210 and cap layer 2212. The resulting structure of read sensor 2200 after completion of step 2120 is illustrated in FIG. 26.

Figure 27:
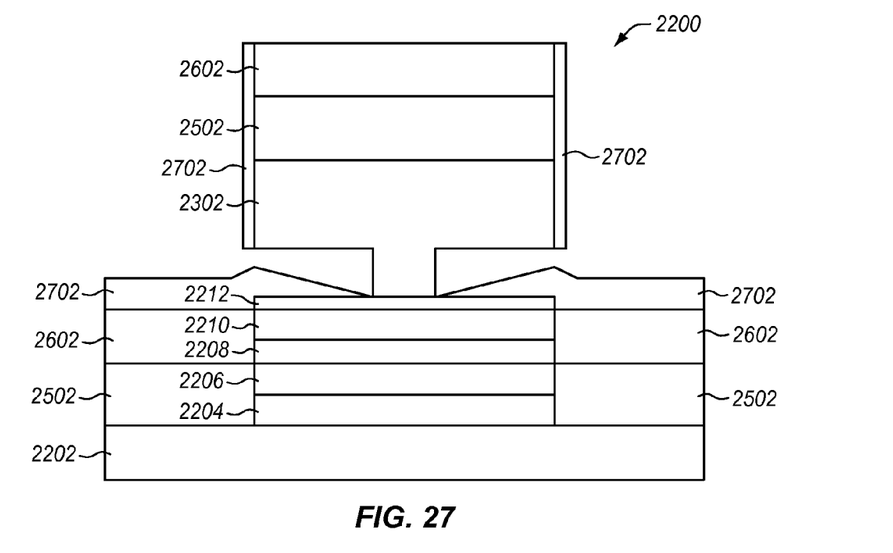

Step 2122 comprises depositing insulating material 2702 (see FIG. 27) at an oblique angle with respect to bi-layer resist structure 2302. The oblique angle may be between 60 degrees and 80 degrees depending on the height of read sensor 2200. As a result of the oblique deposition angle, insulating material 2702 is deposited under bi-layer resist structure 2302. The resulting structure of read sensor 2200 after completion of step 2122 is illustrated in FIG. 27.

Figure 28:
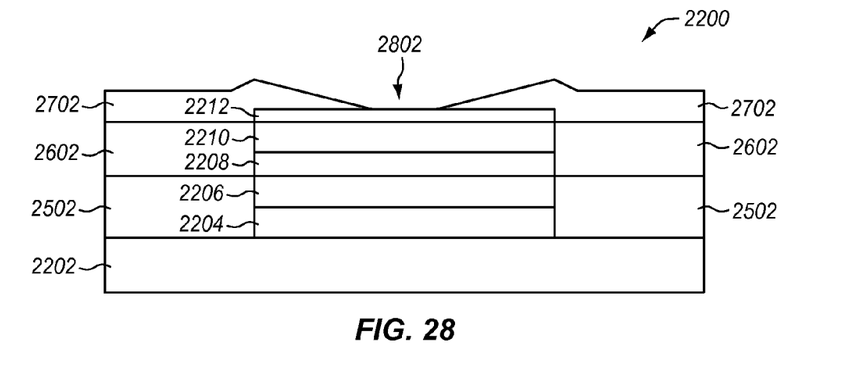
Figure 29:
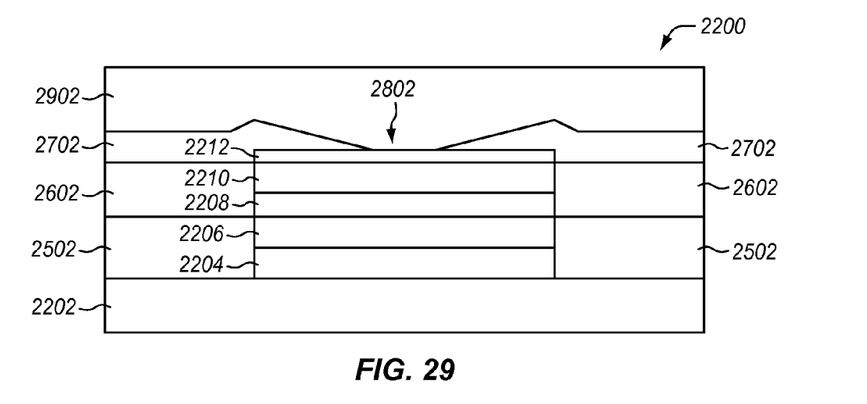

Step 2124 comprises removing bi-layer resist structure 2302, for example, using a stripping process. The removal of bi-layer resist structure 2302 leaves an aperture 2802 (see FIG. 28) in insulating material 2702, which exposes cap layer 2212. The resulting structure of read sensor 2200 after completion of step 2124 is illustrated in FIG. 28. Step 2126 comprises depositing a second shield layer 2902 (see FIG. 29) on insulating material 2702. A portion of second shield layer 2902 is formed within aperture 2802 such that second shield layer 2902 and cap layer 2212 are electrically coupled. The resulting structure of read sensor 2200 after completion of step 2126 is illustrated in FIG. 29. Depending of the desired spacing between the shields, some of this cap layer may be etched, in situ, prior to depositing the second shield.

For a conventional CPP stack structure where $I_{free}=I_{ref}=I$ is uniformly spread through the stack cross sectional area $A_{free}=A_{ref}=A$, the total GMR contribution $ARA$ to the RA product has approximately equal contributions from both free and reference layers (i.e., $\Delta RA_{free} \approx \Delta RA_{ref} \approx \Delta RA/2$). The net signal is given by:

$$\Delta V = (I_{free} \Delta RA_{free})/A_{free} + (I_{ref} \Delta RA_{ref})/A_{ref} = I(\Delta RA)/A_{ref}$$

However, in regards to the present embodiments, the net signal $\Delta V$ is determined only from those electrons which transit through both free and reference layers. If $A_{free}(eff)$ and $A_{ref}(eff)$ are the effective cross sectional area of free and reference layers which share the common current, and where $I_{free} \geq I_{ref}$ due to possible spreading of (more) reference (than free) layer current into the hard bias structure, it follows that:

$$\Delta V = \frac{1}{2} I_{ref} \left( \Delta RA / A_{free}^{eff} + \Delta RA / A_{ref}^{eff} \right)$$

The current $I_{ref}$ will be limited by spin-torque effects. This may be expressed as:

$$I_{ref} \leq \text{lesser}(r \cdot J_{free}^{crit} A_{free}^{crit}, J_{ref}^{crit} A_{free}^{crit}), r \equiv I_{ref}/I_{free},$$
$$A_{free,ref}^{crit} \leq A_{free,ref}$$

Where J(crit) is the spin-torque critical current density in the case of uniform current flow through the stack cross-section, and I(crit)=J(crit)A(crit) is the critical current when accounting for non-uniform current flow in either free or reference layers. For the AP free layer design in particular, $J_{free}$(crit)$\gg J_{ref}$(crit), and $I_{ref}$ will be limited by $J_{ref}$(clit) provided that $I_{ref}/I_{free}$ is not too small because the hard bias shunts too much current from the reference layer relative to that of the free layer. In the macrospin model, the spin-torque depends only on the total current, and $A_{ref}$(crit)$\rightarrow A_{ref}$ independent of $A_{ref}$(crit). More generally, $A_{ref}$(crit) may be less than $A_{ref}$ and particularly so in the case where substantial shunting of current away from the reference layer into the hard-bias restricts $A_{ref}$(eff) to the outer perimeter of the reference layer where the magnetization is least stable against spin-torques due to lack of exchange coupling to exterior regions.

In general, an approximate optimum for a given aperture size is likely achieved when the combination of natural current spreading in the spacer layer, plus spreading enhancement (if any) by contiguous conductive hard bias layers, spreads out $I_{ref}$ approximately uniformly throughout the reference layer cross-section (despite that $A_{free}(\text{eff}) \ll A_{free}$), with little or no loss of $I_{free} \approx I_{ref}$ to the hard bias layer. In this case, $A_{ref}(\text{crit}) \approx A_{ref}$, and the signal becomes:

$$\Delta V \cong \frac{1}{2} J_{ref}^{crit} \Delta RA \left(1 + A_{ref} / A_{free}^{eff}\right), I^{crit} \cong I_{ref}^{crit} \cong J_{ref}^{crit} A_{ref}$$

In this case, the maximum/critical current remains the same, but embodiments presented herein offer a signal advantage of $(1+A/A_{free}(\text{eff}))/2$ over a non-apertured conventional CPP GMR stack of same physical area A, which depending on the aperture size may easily be several fold. The present embodiments also maintain an rms mag-noise reduction factor of sqrt($A/A_{free}$(eff)) compared to a conventional stack with the physical free layer area reduced to the same value as $A_{free}$(eff). Additional current spreading through the AP coupling layer plus the pinned layer into contiguous conductive hard bias layers will also further reduce the parasitic resistance, particularly that of the low conductivity AFM layer, in comparison to a conventional CPP GMR stack.

Although specific embodiments were described herein, the scope of the invention is not limited to those specific embodiments. The scope of the invention is defined by the following claims and any equivalents thereof.

We claim:

1. A read sensor comprising:
 a first shield;
 a sensor stack including an antiparallel (AP) free layer, a first surface of the sensor stack electrically coupled to a surface of the first shield;
 insulating material disposed on an opposing second surface of the sensor stack; and
 a second shield disposed on the insulating material, wherein the insulating material has an aperture providing electrical coupling of the sensor stack and the second shield; and
 hard bias structures electrically coupled to the sensor stack on opposing sides of the sensor stack, and electrically coupled to the surface of the first shield so as to direct sensing current away from the sensor stack and towards the first shield.

2. The read sensor of claim 1 wherein a width of the aperture is substantially smaller than a width of the AP free layer.

3. The read sensor of claim 1, wherein:
 the sensor stack comprises a reference layer; and
 the hard bias structures are adapted to acquire sensing current from the sensor stack and to direct the sensing current to the surface of the first shield, reducing current density of sensing current at the reference layer in relation to current density of sensing current at the AP free layer.

4. The read sensor of claim 3 wherein the hard bias structures comprise:
 a seed layer electrically coupled to the first shield; and
 a hard bias layer electrically coupled to the seed layer.

5. The read sensor of claim 1 wherein the sensor stack comprises:
 an antiferromagnetic (AFM) layer;
 a reference layer formed directly on the AFM layer;
 a non-magnetic spacer layer formed directly on the reference layer;
 the AP free layer formed directly on the non-magnetic spacer layer; and
 a cap layer formed directly on the AP free layer, and connected to the second shield through the aperture, wherein a width of the cap layer is substantially smaller than a width of the AP free layer.

6. The read sensor of claim 5 wherein widths of the AFM layer, the reference layer, the non-magnetic spacer layer, and the AP free layer are substantially the same.

7. The read sensor of claim 5 wherein a resistance of the hard bias structures is less than or equal to a resistance of the AFM layer.

8. The read sensor of claim 5 wherein heights of the hard bias structures are substantially planar with a top surface of the AP free layer.

* * * * *